Aug. 8, 1944. C. R. NICHOLS, JR 2,355,461
CELL ASSEMBLING PROCESS AND APPARATUS
Filed Aug. 1, 1941 5 Sheets-Sheet 1

INVENTOR
CHARLES R. NICHOLS, JR.
BY
Trenton Meredith
ATTORNEY

Aug. 8, 1944. C. R. NICHOLS, JR 2,355,461
CELL ASSEMBLING PROCESS AND APPARATUS
Filed Aug. 1, 1941 5 Sheets-Sheet 2

INVENTOR
CHARLES R. NICHOLS, JR.
BY
Trenton Meredith
ATTORNEY

Aug. 8, 1944.   C. R. NICHOLS, JR   2,355,461
CELL ASSEMBLING PROCESS AND APPARATUS
Filed Aug. 1, 1941   5 Sheets-Sheet 4
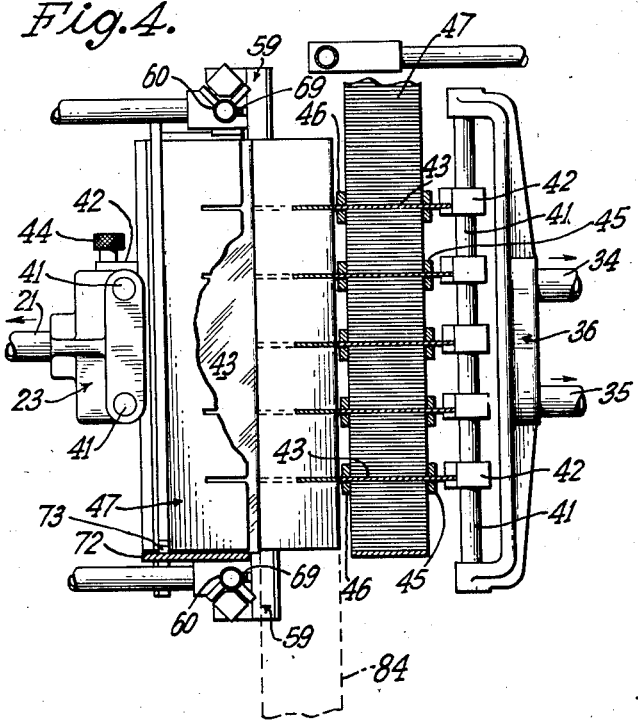
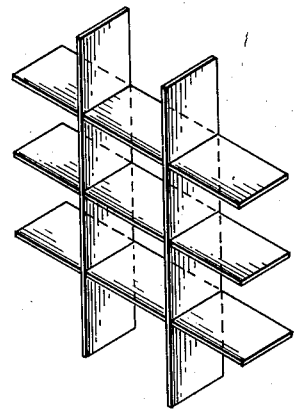
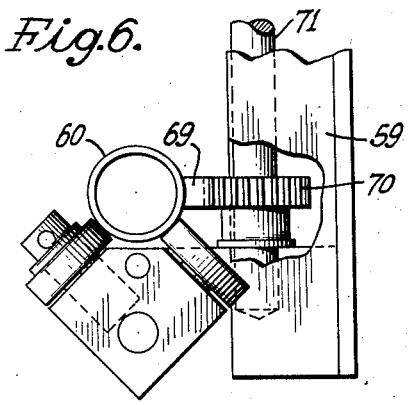
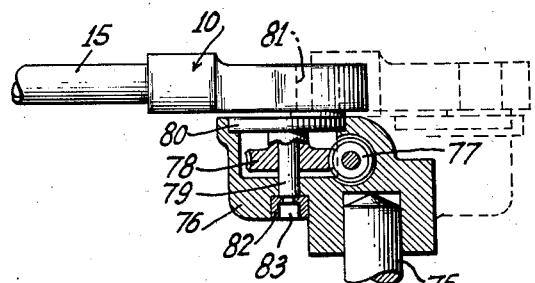
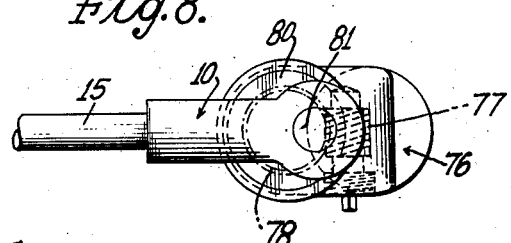
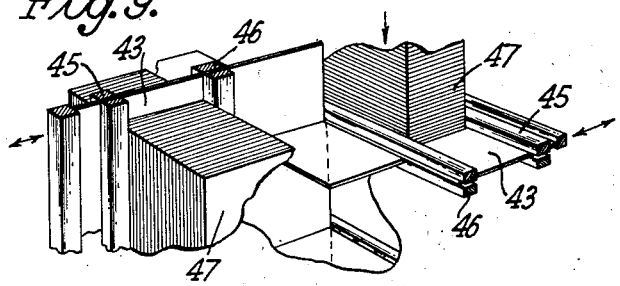
INVENTOR
CHARLES R. NICHOLS, JR.
BY
Stenton Meredith
ATTORNEY Aug. 8, 1944.  C. R. NICHOLS, JR  2,355,461
CELL ASSEMBLING PROCESS AND APPARATUS
Filed Aug. 1, 1941  5 Sheets-Sheet 5
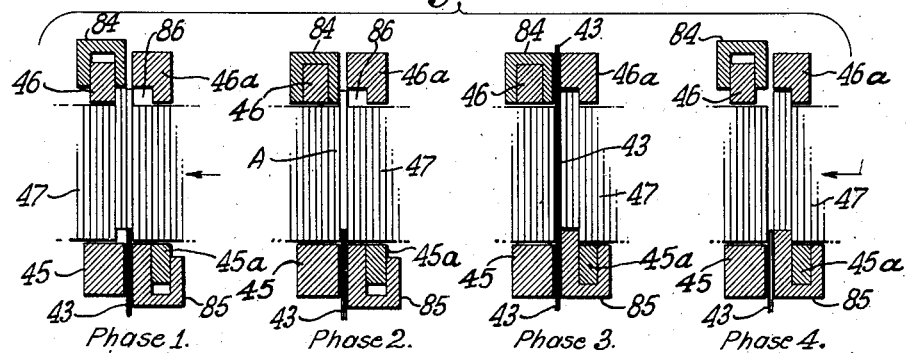
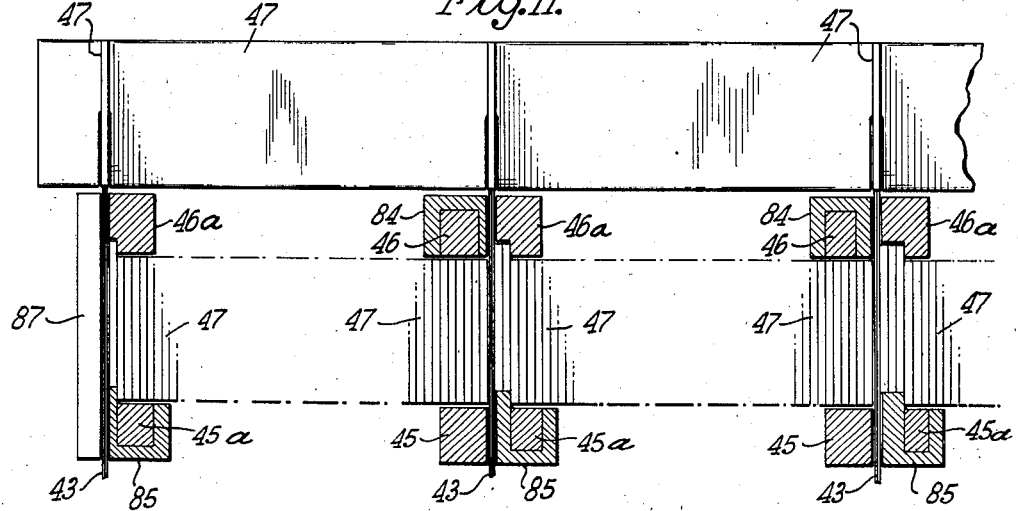
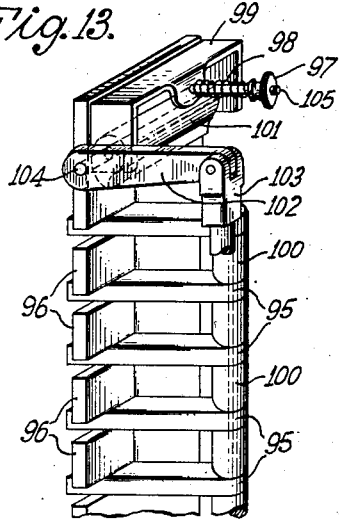
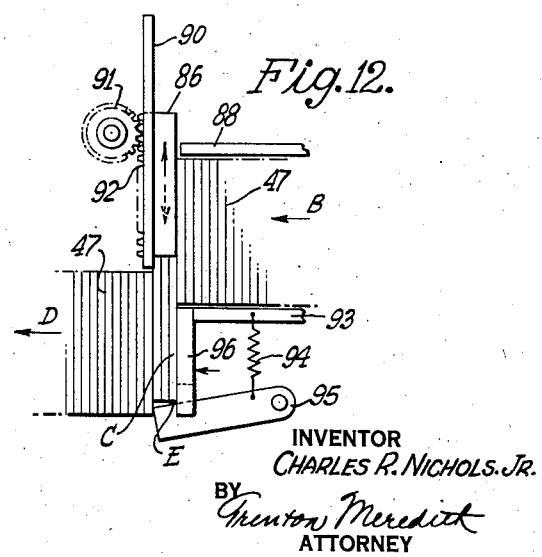
INVENTOR
CHARLES R. NICHOLS, JR.
BY Trenton Meredith
ATTORNEY Patented Aug. 8, 1944

2,355,461

UNITED STATES PATENT OFFICE 2,355,461

CELL ASSEMBLING PROCESS AND APPARATUS

Charles R. Nichols, Jr., Jersey City, N. J.

Application August 1, 1941, Serial No. 405,090

21 Claims. (Cl. 93—37)

This invention relates to a new and improved process and apparatus for assembling preformed partition blanks into partitions such as those which are employed in cartons for packing fragile articles as eggs and the like.

Packing cells are made by assembling partition blanks which have been notched usually from one longitudinal edge thereof to a point about midway between the edges; so that when the notched portion of one blank is fitted into that of another, and all the notches of all the blanks are occupied, the cell is complete.

This operation is usually performed by hand, but machines have been devised for the purpose; however, those which are known to have been proposed are complicated, cumbersome and difficult of construction and continual operation. Thus, the initial cost is high, maintenance is expensive because of the many parts which may become worn or broken, and the operation of such machines is uneconomical since the attention of a skilled operator is constantly or frequently required. Furthermore, variations or adjustments for different cell structures is a difficult or extensive task. Manual assembly of these cell blanks is expensive and is unsatisfactory where a large number of the cells are required in a short time.

The invention, by which the disadvantages of methods and apparatuses known to applicant are overcome, is illustrated by the following description of a preferred apparatus and method and is not intended to be limited thereby.

Figure 4 is an enlarged view of the working portion of my machine, partially sectioned, showing details of the apparatus in the immediate vicinity of the cell assembly zone.

Figure 1:
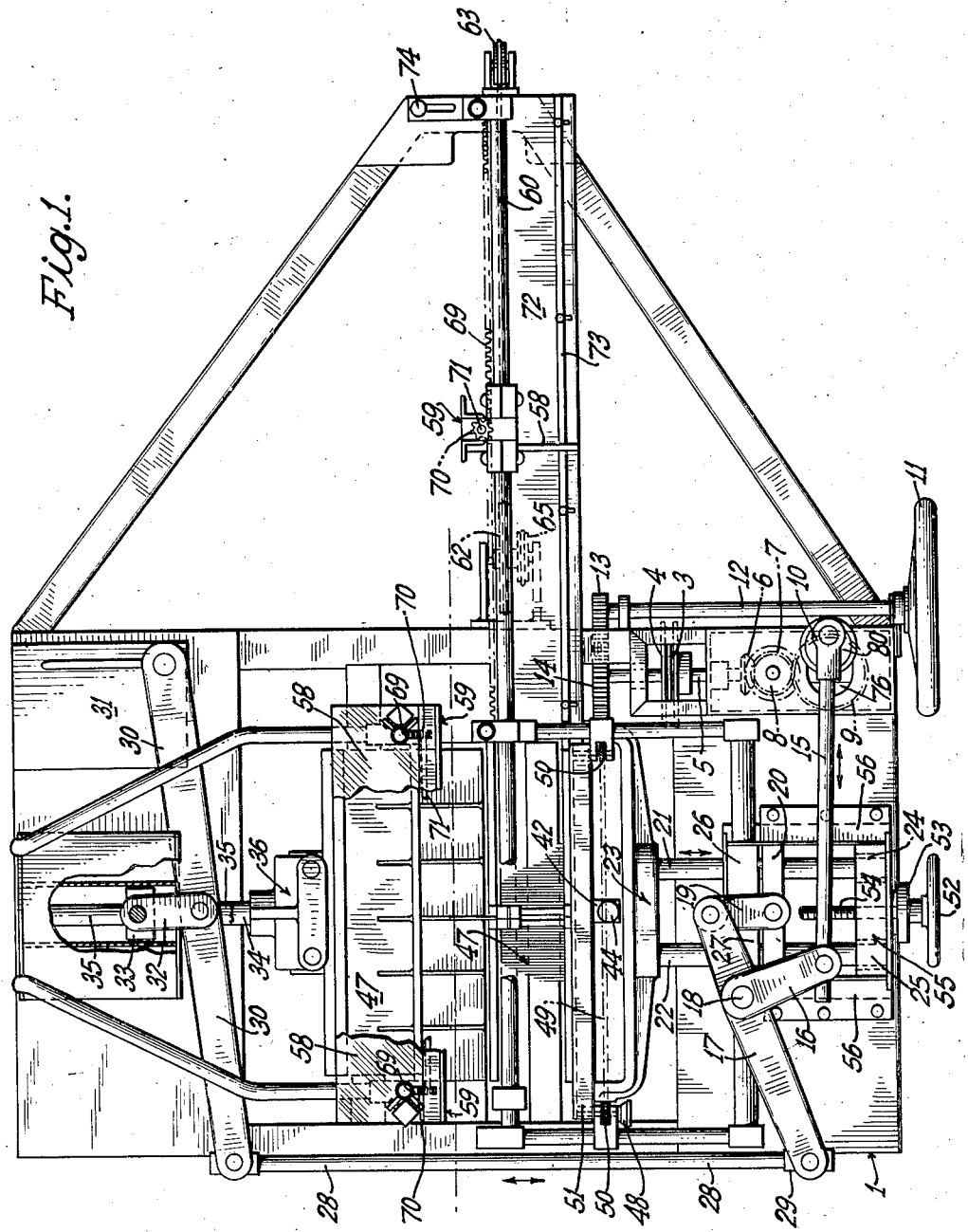
Figure 1 is a plan view of a machine constructed according to my invention.

Figure 5 is a perspective view of a finished cell structure. It is to be understood that any number of the blanks may comprise the cell structure, and the invention is in no wise limited to the number shown here merely for illustration. Furthermore, the size of each cell and the number thereof may vary in the cell structure as desired.

Figure 6 is a detail view of the lower end of a partition blank feeding element. I wish to point out that the apparatus may be equipped with any type of feeding mechanism. This illustrated mechanism has been found to be satisfactory.

Figure 7 is a side elevation, sectioned, of the adjustable throw crank.

Figure 8 is a plan view of the adjustable throw crank.

Figure 9 is a perspective view of a portion of the assembling mechanism showing the strippers, blades, partition blanks in the magazines, and a small portion of an assembled cell structure.

Figure 10 is a plan view of a modified feeding apparatus, showing four phases of its operation.

Figure 11 is a plan view of a feeding assembly utilizing the feeding mechanism of Figure 10.

Figure 12 is a plan view of a modified loading device.

Figure 13 is a perspective view of an element of the loading device.

Referring in detail to the drawings, 1 is the frame support, 2 (Figs. 2 and 3) is a motor or any other source of power which imparts movement to the pulley 4 thru belt 3, or this may be advantageously accomplished thru gears, chains, etc. Pulley 4 is fixedly mounted on shaft 5 on one end of which is also securely mounted bevel gear 6, which is an element of a speed reducing mechanism comprising also bevel gear 7, and spur gears 8 and 9. This speed reducing mechanism may be of an adjustable type such that the speed of the motor 2 is transmitted in any desired ratio of speed reduction to variable throw crank 10.

Hand wheel 11 may be used to actuate the machine for set-up, test or other purposes in this manner: It is securely mounted on shaft 12 which carries fixedly mounted on the other end thereof spur gear 13 which may be engaged with spur gear 14. Spur gear 14 is mounted on shaft 5. When hand wheel 11 is rotated the same type motion is imparted to the speed reducing mechanism as when the motor is running.

Crank 10 is of the variable throw type as is shown in Figures 7 and 8, a more detailed description of which will be given later. Crank 10 (Fig. 1) when rotated imparts a reciprocating motion to link 15 which is adjustably and pivotally attached to lever arm 16. Lever arm 16 is fixedly attached to rocker arm 17 which is pivotally mounted at point 18. At one end of arm 17, link 19 is pivotally fixed thereto and the other end of link 19 is pivotally attached to cross member 20. Member 20 is a part of a reciprocating element which includes push rods 21 and 22. Rods 21 and 22 are attached to the blade support frame or carriage 23. The rods 21 and 22 reciprocate in bearings 24, 25, 26, and 27.

Figure 3:
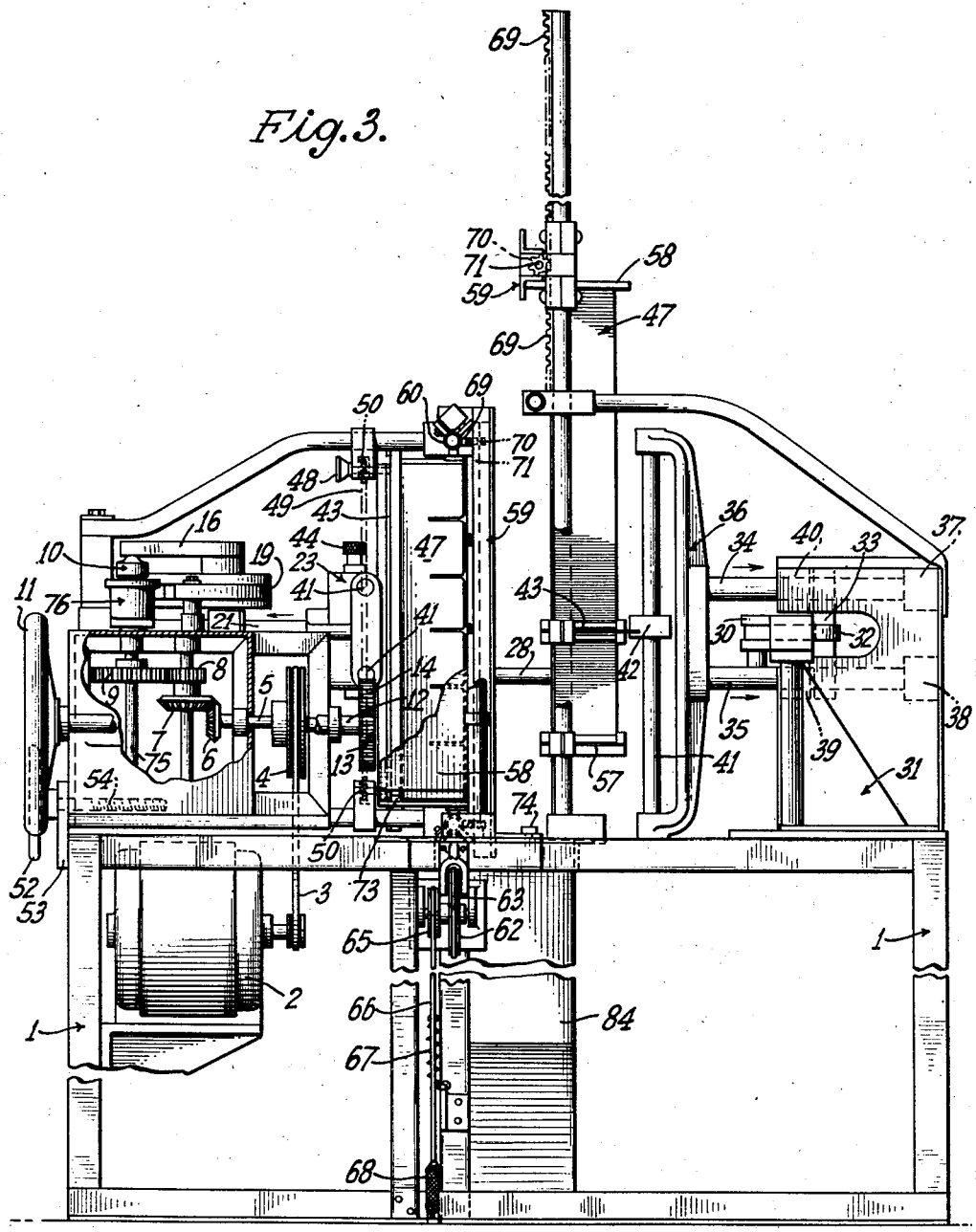
Figure 3 is an end view of a portion of the machine (a part of the horizontal magazine is omitted) from a point at the right side of Figure 1.

One end of rocker arm 17 is pivotally and adjustably attached to link 28 thru adjusting block 29 which permits an increase or decrease of the effective length of link 28. Link 28 is also pivotally attached at one end to lever arm 30 which is mounted pivotally on bearing support 31. Near the center of lever arm 30 is pivotally attached link 32, which in turn is pivotally affixed to vertical cross member 33. Member 33 is a part of the reciprocating structure composed of push rods 34 and 35 and blade support frame or carriage 36. This structure reciprocates on rods 34 and 35 supported by means of bearings 37, 38, 39, and 40 (Fig. 3). Blade supporting frame 36 is preferably of the same form as frame 23 and is preferably mounted in a plane which is at a right angle to that of frame 23.

Frames 23 and 36 carry removable rods 41 (Fig. 4) upon which are slidably mounted blade mountings 42 to which are fixedly attached blades 43. Mountings 42 are equipped with locking devices 44 for securing them to rods 41 at any desired location on said rods 41. Rods 41 may have mounted thereon any desired number of blades thru the mountings 42. Blades 43 are advantageously of a straight edge type, but the design may be varied to suit the particular problem.

Blades 43 reciprocate between back strippers 45 and completely thru front strippers 46 (Figs. 4 and 9). During the forward movement of blades 43, a blank is advanced from magazines 47 through front strippers 46 into the assembly zone. Each set of the two pairs of strippers and each blade is adjustable to align with any position at which the blade is set.

The function of the strippers is, briefly, this: The front strippers 46 prevent more than one blank from being removed from the magazine, and guide the blank into the correct assembling position. The back strippers 45 serve as a guide to the blade 43 and prevent disarrangement of the blanks as the blade is withdrawn from the assembling position. Each pair of strippers is adjustable for blade clearance to permit the use of blades of different thicknesses. The distance between the two pairs of strippers may be varied to admit blanks in the magazines of varying widths by changing the relative position of the back strippers. This is accomplished simultaneously and equally with respect to all the pairs of back strippers 45 by turning knob 48 which, by means of chain 49 and sprockets 50, having as a part thereof threaded portions, change the position of coordination frame 51 which in turn determines the position of back strippers 45. The same adjusting means is a part of the other blade carrying carriage but is not shown.

The assembly space may be varied to accommodate blanks of varied widths by means of adjusting hand wheel 52 which is rotatively mounted on bracket 53 which is affixed to frame 1. Adjusting hand wheel 52 rotates threaded member 54 by means of a threaded portion of bearing support 55, which is slideably mounted in guides 56. Thus, it will be seen that the assembly zone between the opposite front strippers 46 may be varied by simply turning adjusting hand wheel 52 in the desired direction since the stripper assembly for this side is fixedly fastened to bearing support 55. The opposite stripper assembly and bearing support are preferably not adjustable.

Both magazine feeding mechanisms operate in the same manner, hence, for the sake of brevity the operation of only one will be explained. It is to be understood as stated hereinbefore, that the specific feeding mechanism is not an essential element of my invention since any method of feeding may be substituted therefor which insures a proper feed and position of the partition blanks.

Figure 2:
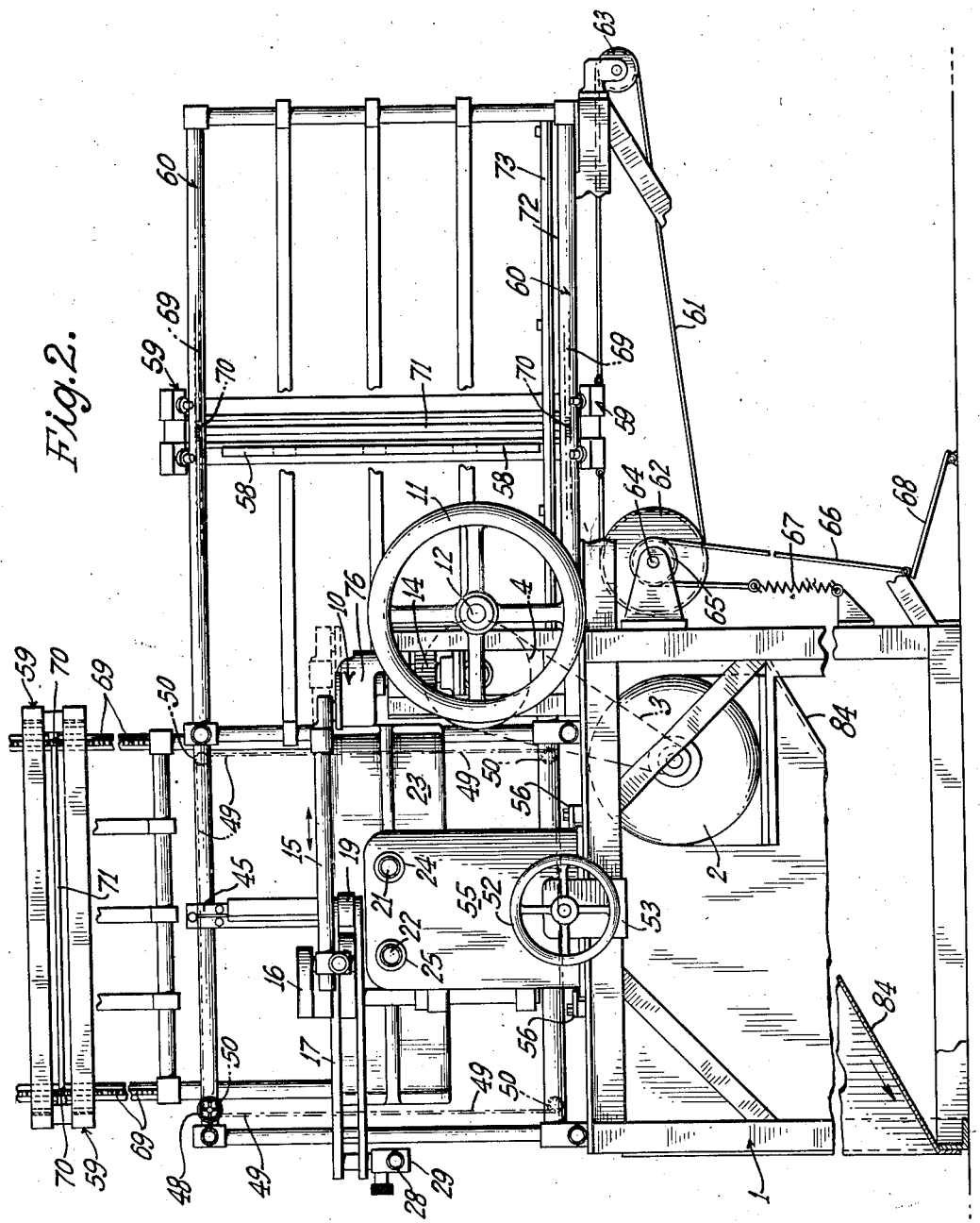
Figure 2 is a side elevation, looking toward the machine from a point at the lower side of Figure 1.

Referring to Figures 2 and 3, the partition blanks are placed so that a side of the first blank lies against flat plate 57 which takes the part of the stripper farthest removed from the feeding end of the magazine. These partition blanks are stacked, one against the other with the notched edges away from blades 43, until the magazine is completely filled. The partition blanks are pushed into position by pusher 58 which is fixedly mounted on carriage 59 which is forced along magazine frame 60 by means of cable 61, and which runs on pulleys 62 and 63. A rotative motion is imparted to pulley 62 by shaft 64 on which it is fixedly mounted, which also carries affixed thereto a smaller pulley 65. Motion is imparted to pulley 65 by means of cable 66 and spring 67. The other end of cable 66 is affixed to pedal 68. Again it will be understood that carriage 59 may be operated by other means such a weight arrangement, a motor driven cable, etc.

The perpendicularity of carriage 59 to frame 60 is maintained as follows: Two racks 69 are fixedly mounted to frame 60 near each end of the carriage which engage two pinions 70 (Fig. 6) which are fixedly mounted on shaft 71. Simultaneous and equal movement of both ends of the carriage 59 is assured by the pinions 70 and the teeth of the racks 69.

The partition blanks are supported by platform 72 (Figs. 1 and 2) which is fastened to frame 60. A construction may be provided whereby platform 72 is a traveling belt, with a corresponding belt at the top of the feeding carriage. This feeds the blanks and prevents any friction of the ends of the blanks on a fixed platform. Varying widths of partition blanks are provided for by sliding guide strip 73 which can be locked in any position desired. The horizontal blanks are properly lined up by providing a guide strip which is engaged by a corresponding slot of each blank.

The feeding magazine mechanism varies in position with bearing support 55 and the stripper assembly with which it is aligned by frame 60. When a desired position is reached, frame 60 is locked at its end by thumb screw 74.

The construction of the variable throw crank 10, hereinbefore referred to, is as follows: Referring to Figures 7 and 8, upon shaft 75, body 76 is fixedly mounted so that when shaft 75 is rotated by pinion gear 9, body 76 also rotates. Mounted within body 76 are worm 77 and worm gear 78. Worm gear 78 is fixedly mounted on shaft 79 which is in turn fixedly mounted to disc 80. Eccentrically affixed to disc 80 is crank pin 81. End motion of shaft 79 is prevented by washer 82 which is affixed to shaft 79 by screw 83 and by disc 80 which bears against the shoulders in body 76. It will be readily seen that the rotary motion of worm 77 will cause worm gear 78 to revolve and consequently disc 80. This will change the position of crank pin 81 with respect to drive shaft 75, thus varying the stroke or effective crank length of the variable throw crank 10. The inherent locking ability of the worm 77 and worm gear 78 is in general sufficient, but should the need require, an additional locking device such as a clamp on disc 80 (not shown) formed by two lugs and a screw affixed to body 76 may be employed to more securely fasten disc 80 in any desired position.

It is advantageous that the blanks be in a straight position when they are to be ejected into the assembly zone. When the blanks are thin and of any appreciable length, they tend to bend, and, thus, interfere with the proper action of blades 43, the edges of which will, if the blanks are bent, contact more than one blank. Since only one blank can be ejected by a single blade during one ejecting movement, the machine will then be jammed. In order to prevent that possibility and insure suitable positioning of the blanks in the magazines 47, I prefer to use the modified feeding assembly which will now be described.

Instead of the simple front and back strippers 46 and 45 as shown in Figures 4 and 9, I employ front strippers 46, 46a and the additional element 84 (Figures 10 and 11) and back strippers 45, 45a and element 85. It will be observed that front stripper 46a contains a rectangular notch 86 which varies in width with the position of the blade with which it coacts: that is, the notch 86 in the front stripper 46a, which is farthest from the pusher 58 (which for convenience we shall designate as position No. 1), is approximately the width of the thickness of one blank. The notch in front stripper 46a, which is in position No. 2, is the width of the thickness of two blanks, etc. (See Figure 11.) Th same is true of that arm of reciprocating element 85 which is adjacent blade 43. The arm of reciprocating element 84 in position No. 2 which is adjacent the blade 43 is the width of the thickness of one blank. (There is no element 84 in position No. 1) it is the width of the thickness of two blanks in position No. 3, etc. The reasons for these dimensions will become evident with an understanding of this feeding mechanism.

Figure 10 illustrates diagrammatically the four phases of operation of a single stripper assembly (that of position No. 3), or the extremes of the positions assumed by elements 84 and 85 which reciprocate (by means not shown).

After the blade 43 ejects a blank into the assembly zone it is withdrawn to the position shown in phase 1 (Fig. 10). This permits three blanks, whose front edges have occupied the notch or space 86, to be advanced until the first one is adjacent front stripper 46, leaving the third one with its front edge facing the space between reciprocating element 84 and front stripper 46a, and its back edge aligned with blade 43. Since this is position No. 3, two blanks will have been ejected by the blades in position Nos. 1 and 2 (one each), thus requiring two blanks to refill the magazine of these two positions for the next operation. When the three blanks are advanced from the space 86 to front stripper 46, the magazine will be completely filled again, and the force, indicated by the arrows, will maintain the blanks in proper position or alignment with respect to blade 43. However, since front stripper 46 is preferably the full length of the blank, the position of the front edge of the blank to be ejected will be insured as being opposite the space between element 84 and front stripper 46a. Because the adjacent (to the right in Fig. 10) blank lies against the blade 43, the edge of the blank to be ejected next cannot avoid the correct position in front blade 43.

In phase 2, element 84 has been advanced until the front edges of its arms are in alignment with that of front stripper 46, and the two blanks in front of its inner arm in phase 1 have been forced into the position shown in phase 2.

In phase 3, the blade 43 has ejected a blank into the assembly zone, and, preferably simultaneously, element 85 has assumed its new position and pushed three blanks forward into space 86.

In phase 4, blade 43 has been withdrawn to the position shown, and element 84 has also returned to the position shown. Thereafter, element 85 is withdrawn to the position shown in phase 1, the blanks are advanced from right to left until the magazine is filled as in phase 1, and the cycle is repeated.

In Figure 11, the position of stripper elements 84 and 85 correspond to phase 3 of Figure 10.

Generally the use of this feeding mechanism will be advantageous, but it is to be understood that my invention is not limited thereto.

In order to insure a proper and uniform pressure at all times in the magazine zones, it has been found advantageous to provide a magazine loading device such as is illustrated in Figures 12 and 13. Figure 12 is a schematic diagram showing the simple operation performed by this device, and Figure 13 is a perspective drawing of an element of this device hereinafter to be described. Thus pusher 58 exerts a pressure designated by the letter B, Figure 12, which always holds the blanks 47 against the stop 90. The plunger 86, which is operated by gear 91 and rack 92, reciprocates in the direction indicated by the arrows. The thickness of the plunger 86 is adjusted to engage a necessary number of blanks to fill all stations in the magazine. For example, if the machine is set up to push three blanks from a side, as shown in Fig. 11, the plunger would be set to engage three blanks, as illustrated in Fig. 12. As the plunger moves in the direction indicated by the dotted arrow, it pushes a required number of blanks into position C until the outermost edge of the blanks abut against the arms of the gate 95 at point E. The plunger forces the partitions over into such a position that they line up with those already positioned in the magazine. A slight pressure is maintained against gate 95 by the spring 94.

After the partitions have been ejected into the assembly zone and the blade 43 has returned to a position shown in phase 1, Fig. 10, and the blanks are left in a position shown in phase 4, Fig. 10, the slotted plunger 96 is pushed forward (in the direction indicated by the arrow) by means of two cams, one of which is shown at 101, the other being identical and at the bottom of the slotted plunger 96. Normally, plunger 96 is withheld from its forward position by the assembly comprised of spring 98, rod 105, and nut 97, which adjusts the spring tension. The cams are operated by linkages comprised of shaft 104, arm 102, and clevis 103. The plunger 96 pushes the blanks forward until the edge of the last blank, shown at point E, clears the end of the several arms of the gate 95. At this point the pressure exerted by spring 94 pulls these arms back to the stops provided by the bottoms of the slots in plunger 96.

The plunger 86 is at this time moved back in the direction of the solid arrow (Fig. 12) until it clears the edge of guide strip 88, and slotted plunger 96 is returned to its original position as shown in Fig. 12. The pressure exerted by pusher 58 and indicated by force B (Fig. 12) causes a new set of blanks 47 to be pushed forward until they abut against stop 90. It will readily be seen that these blanks, plus a position of the gate 95, will prevent the partition blanks just forced into the magazine from returning to their original position when plunger 96 is returned to its position as shown in Fig. 12.

The efficacy of this device is apparent when it is understood that exactly the same number of blanks are placed into exactly the same position once during each cycle. Again it is not my purpose to limit my invention to this particular method of magazine loading or pressure maintenance, since this is but one of many ways in which this operation can be performed to advantage.

I do not intend to limit this invention to the specific reciprocating mechanism which includes links 15, 16, 17, 19, 28, 30 and 32 as many other types may be devised which will perform the same function and which represent more or less complete deviations from the type shown.

It is believed that the operation of the machine illustrated by the drawings will be clear to one skilled in the art from the foregoing, but a brief description of its operation will be now given:

Each magazine is filled by placing a partition blank with one side flat against the stripper unit or plate 57 with its slotted edge away from the blade 43, and other blanks in the same relative position until the magazine is completely filled. Carriage 59 is then positioned so that pusher 58 is pushing on the blank farthest from the plate 57.

Before the magazines are filled, the reciprocating mechanism is so positioned that the blade carrying elements and hence the blades are farthest apart, leaving the magazines completely filled with blanks. After the magazines have been filled with partition blanks, as described hereinbefore, power of the motor actuates the speed reducing element which transmits motion to the reciprocating mechanism, thus bringing the blade carriages toward each other.

Each blade ejects a partition blank from the magazine serving it into the cell assembly zone defined by front strippers 46 of each side. As the blanks are forced into this space, the slotted portion of each horizontal blank (Fig. 9) is engaged with a slot of a vertical blank, until the cell is completed as shown in Figure 5.

During the assembling operation the vertical blanks are supported by platform 72. Also, during this operation the horizontal blanks are supported by adjacent blanks, front strippers 46 and the slots in the vertical blanks.

When the cell structure is completed the blades start the opposite direction of the reciprocating movement. At this moment the cell is without support and drops into the chute 84 below, where it folds itself by reason of its impact on the chute and the angle of the chute floor; then it may be directed by the force of gravity to any desired location. Means may be provided for conveying the cell from the end of the chute.

Upon withdrawal of the blades from between adjacent blanks of the magazines, the force exerted by the carriage 59 bearing against the outermost blank causes the blanks to move toward plate 57, thus filling the space left by the ejected blanks and the withdrawn blades, and positioning the blanks for the next ejecting movement of the blades.

As pointed out before the distance between the blades can be changed by adjusting the blades on the blade carrying rods 41 and corresponding positioning of the strippers. Thus any number of blades may operate on each blade carrying element, and they are readily adjusted to assemble a cell structure of the desired number of partition blanks. It is to be understood that the reference to horizontal and vertical blanks is not limiting with respect to position, since deviations therefrom are within the purview of my invention.

My invention is not dependent upon one magazine feeding partition blanks at right angles to those of the other, nor of the assembling blades of one side being disposed at right angles to the blades of the other. Possible variations in my apparatus, which will be evident to one skilled in the art, would permit construction of my apparatus and operation thereof such that the cell would be assembled with its partition blanks forming angles other than right angles. Other equivalents in the elements of my illustrated apparatus will suggest themselves to persons skilled in this art having a knowledge of the foregoing, but such equivalents, both in apparatus and method, are intended to be within the scope of the appended claims.

This application is a continuation-in-part of my application Serial No. 291,666, filed August 24, 1939.

Having described and illustrated my invention, what I claim is:

1. A method of forming partition cells which comprises feeding partition blanks into predetermined positions in each of two stationary feeding magazines, and forcing a plurality of said blanks from each of the two magazines simultaneously into assembling position.

2. A method of assembling preformed slotted partition blanks into cell structure which comprises ejecting a predetermined number of said blanks from a single stationary magazine into an assembling zone, and simultaneously ejecting from another stationary magazine a predetermined number of said blanks in an opposite direction into said assembling zone, and causing the slots in the oppositely ejected blanks to engage to form the cell structure.

3. A method of assembling preformed partition blanks into a cell structure which comprises supplying said preformed partition blanks to a plurality of predetermined positions while maintaining them in a vertical position in a single magazine, ejecting therefrom a predetermined number of blanks into an assembling zone, supplying in another magazine oppositely disposed blanks in a horizontal position, and ejecting therefrom, simultaneously with the oppositely ejected blanks, a predetermined number of blanks so that the blanks are caused to engage slots therein, each with the other.

4. A method for assembling cell structures which comprises simultaneously ejecting a plurality of slotted strips from each of two perpendicularly disposed stacks of such strips which strips are held in parallel positions perpendicular to an axis through the centers of the faces of said strips, the ejected strips being positioned opposite slots in the strips in the other, parallelly disposed stack so that an assembled cell is formed.

5. In an apparatus for assembling preformed partition blanks, the combination with a magazine for supplying substantially vertically positioned blanks to a plurality of predetermined positions, a magazine for supplying substantially horizontally positioned blanks to a plurality of predetermined positions, means for ejecting from each magazine a plurality of blanks into an assembling zone, and means for removing the cell structure from near the zone of assembly.

6. In an apparatus for forming cell structures, reciprocating means for supplying to an assembling zone from a single stationary source a plurality of preformed partition blanks, oppositely disposed reciprocating means, for supplying from a single stationary source a plurality of oppositely positioned blanks, substantially perpendicular to the first blanks, to the assembly zone whereby the blanks are assembled into a cell structure.

7. In an apparatus for assembling preformed partition blanks to provide a cell structure, the combination of means for simultaneously ejecting a predetermined plurality of said blanks from a single magazine into an assembling zone and oppositely disposed means for simultaneously ejecting a predetermined plurality of blanks from a single magazine into the assembling zone.

8. In an apparatus for assembling cell structures, a magazine for slotted, preformed blanks disposed in a vertical plane, a magazine for slotted, preformed blanks disposed in a horizontal plane, means for feeding simultaneously from said magazines a number of said blanks into a cell assembling zone.

9. An apparatus for assembling cell structures comprising means for supplying a plurality of preformed partition blanks to predetermined positions in each of two stationary magazines, oppositely disposed means for ejecting blanks from each of the two magazines into an assembling zone, and means for reciprocally moving said oppositely disposed ejecting means.

10. A method of forming cell structures from preformed blanks which comprises ejecting from a stationary magazine one-half the number of blanks required for a complete cell structure into an assembling zone, and simultaneously ejecting from another magazine the remaining required blanks for the complete structure into the assembling zone, said second number of blanks being substantially perpendicular to said first blanks.

11. A method of forming cell structures from preformed blanks which comprises ejecting from a stationary magazine a plurality of blanks in parallel planes into an assembling zone, simultaneously ejecting from another magazine a plurality of blanks in parallel planes which are substantially perpendicular to the planes of the first blanks, and causing slots in the blanks to engage one another to form the cell structure.

12. In the method of forming cell structures from preformed blanks, the step of ejecting a plurality of such blanks into an assembling zone from between adjacent blanks while retaining the adjacent blanks in a definite position.

13. An apparatus for forming cell structure from preformed blanks, comprising, in combination, means for holding a plurality of blanks in definite positions, reciprocating means for ejecting a plurality of said blanks from between adjacent blanks into an assembly zone, and means for retaining the said adjacent blanks in their original positions.

14. The method of forming partition cells which comprises supplying blanks from primary magazines into secondary magazines, feeding said blanks into predetermined positions in said secondary magazines, and forcing a plurality of said blanks from the secondary magazines simultaneously into assembling position.

15. The process of claim 14 in which the pressure upon the blanks in the secondary magazine is maintained substantially constant.

16. In a partition cell forming apparatus, the combination of two magazines for each of the oppositely disposed sets of blanks, means for feeding the blanks in predetermined number from the primary magazine into the secondary magazine, and means for maintaining a substantially constant pressure along the whole length of the blanks while they are in the secondary magazine.

17. In a partition cell forming apparatus, elements for guiding the blanks while they are be-being ejected into an assembly zone and for permitting only one blank in each of a predetermined number of positions to be ejected, reciprocating elements for aligning the blanks with said guides, and means for ejecting the blanks into an assembling zone.

18. In a partition cell-forming apparatus, means for feeding preformed blanks from primary magazines into secondary magazines, means for maintaining the blanks in predetermined relative positions and to maintain a substantially constant pressure on the blanks, means for positioning a predetermined number of said blanks into an equal number of feeding positions in each magazine, means for restraining additional blanks from interfering with the ejecting of more than the predetermined number of blanks into an assembling zone, and means for ejecting the blanks into an assembling zone whereby the cells are formed.

19. In a cell-assembling apparatus, magazines for guiding preformed cell blanks into positions from which they may be supplied to a cell-assembling zone, means for aligning a blank with each of a plurality of such positions in a single magazine, and means for forcing the blanks so aligned into the cell-assembling zone.

20. In a cell-assembling apparatus, magazines from each of which a plurality of preformed cell-forming blanks are ejected into a cell-forming zone, means feeding additional blanks into the positions vacated by the previously ejected blanks, and means for aligning the blanks with the ejecting positions and for preventing more than one blank from being ejected from each position.

21. In a cell-assembling apparatus in which more than one preformed cell blank is ejected into a cell-assembling zone from each of two magazines, reciprocating means at each ejecting position for supplying to each ejecting position a single blank.

CHARLES R. NICHOLS, Jr.